Patented June 20, 1933

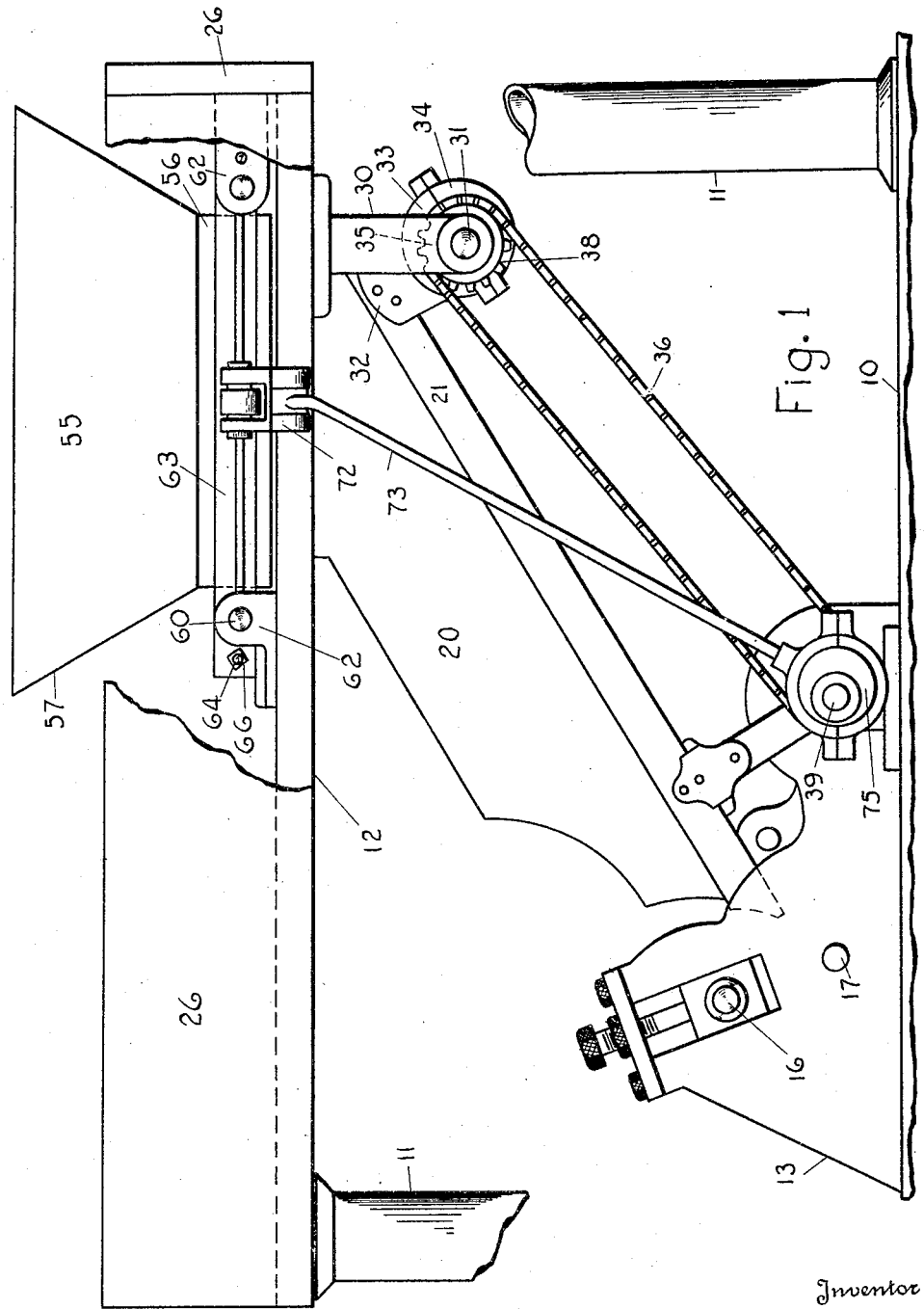

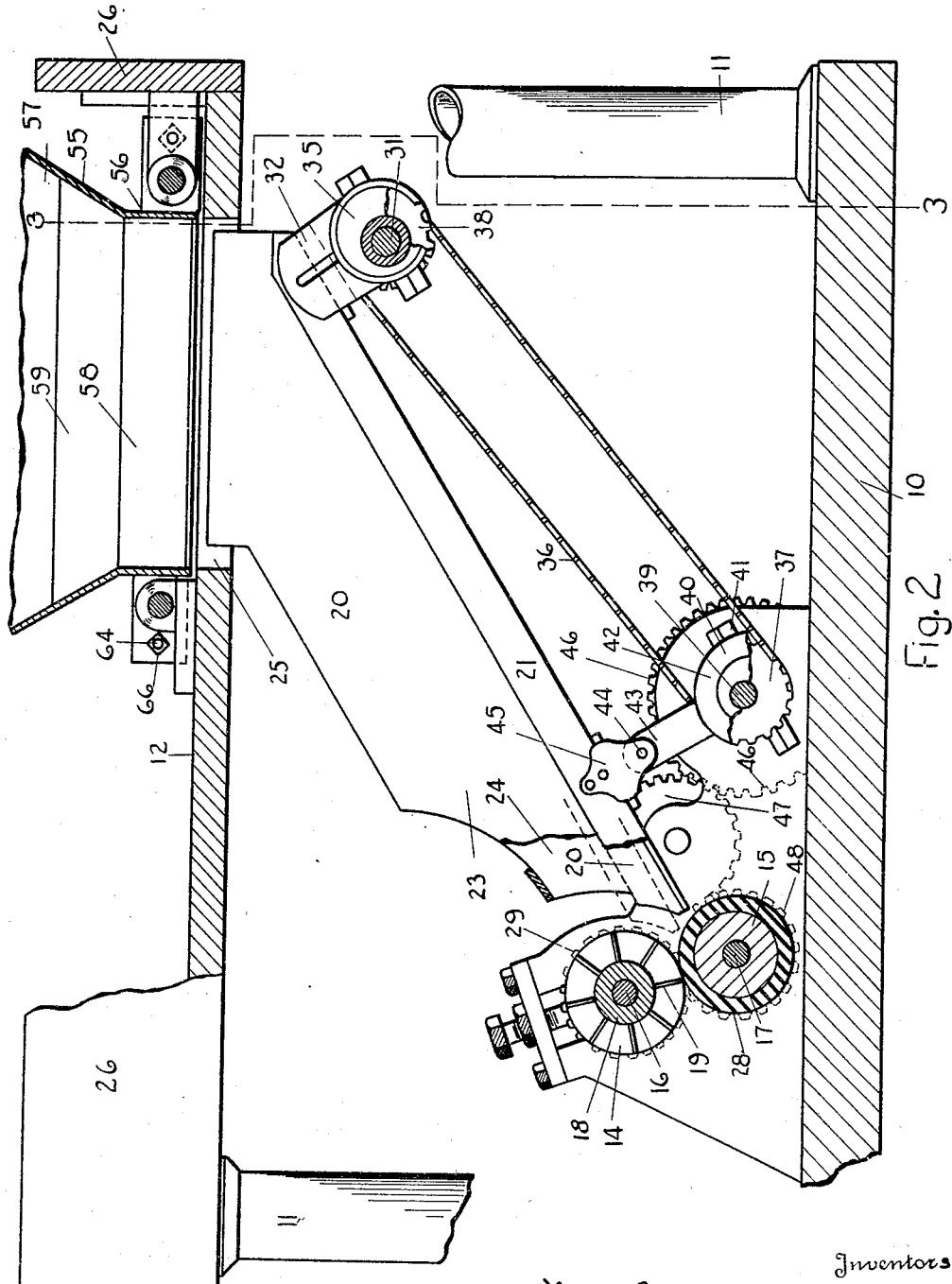

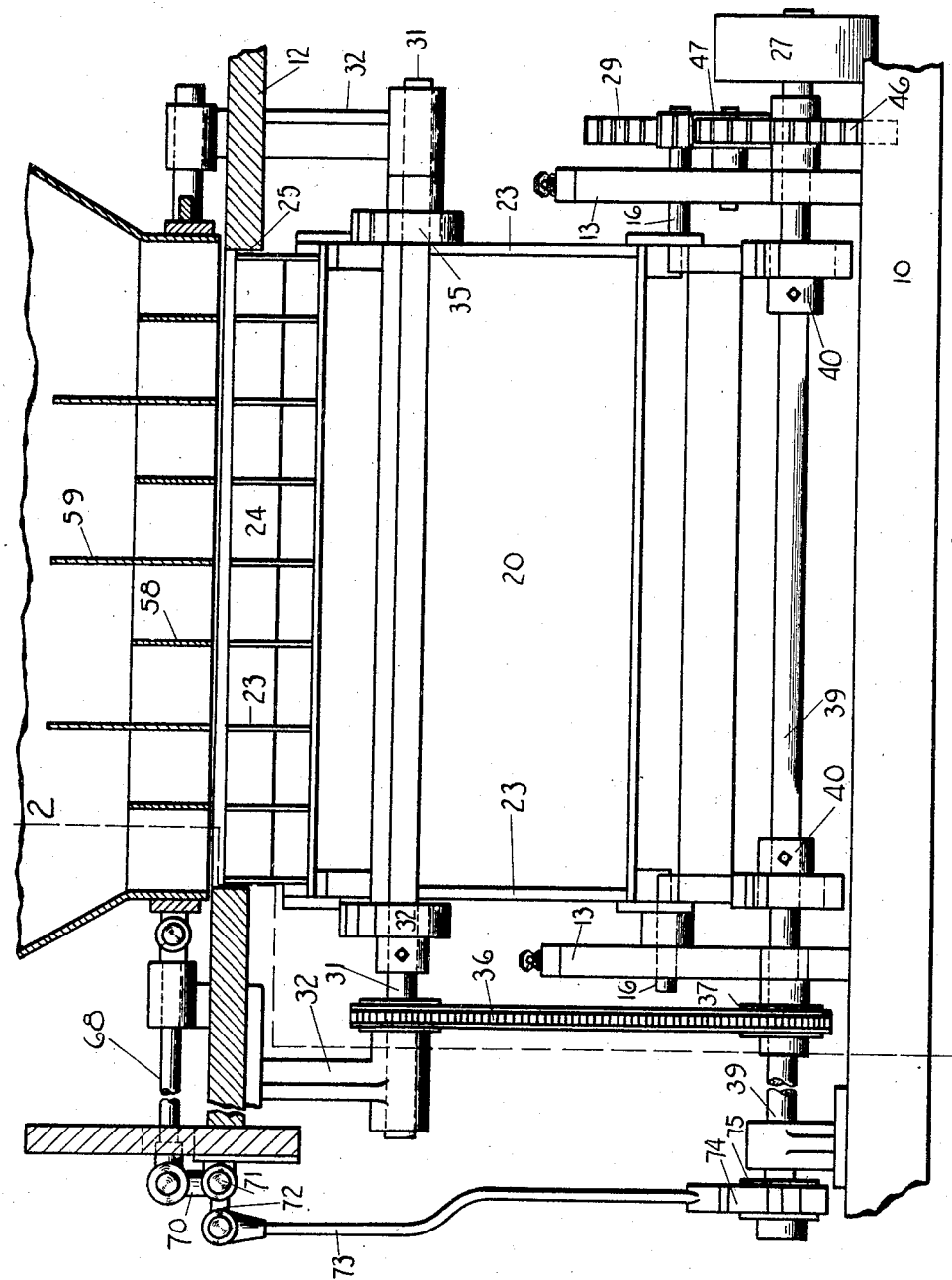

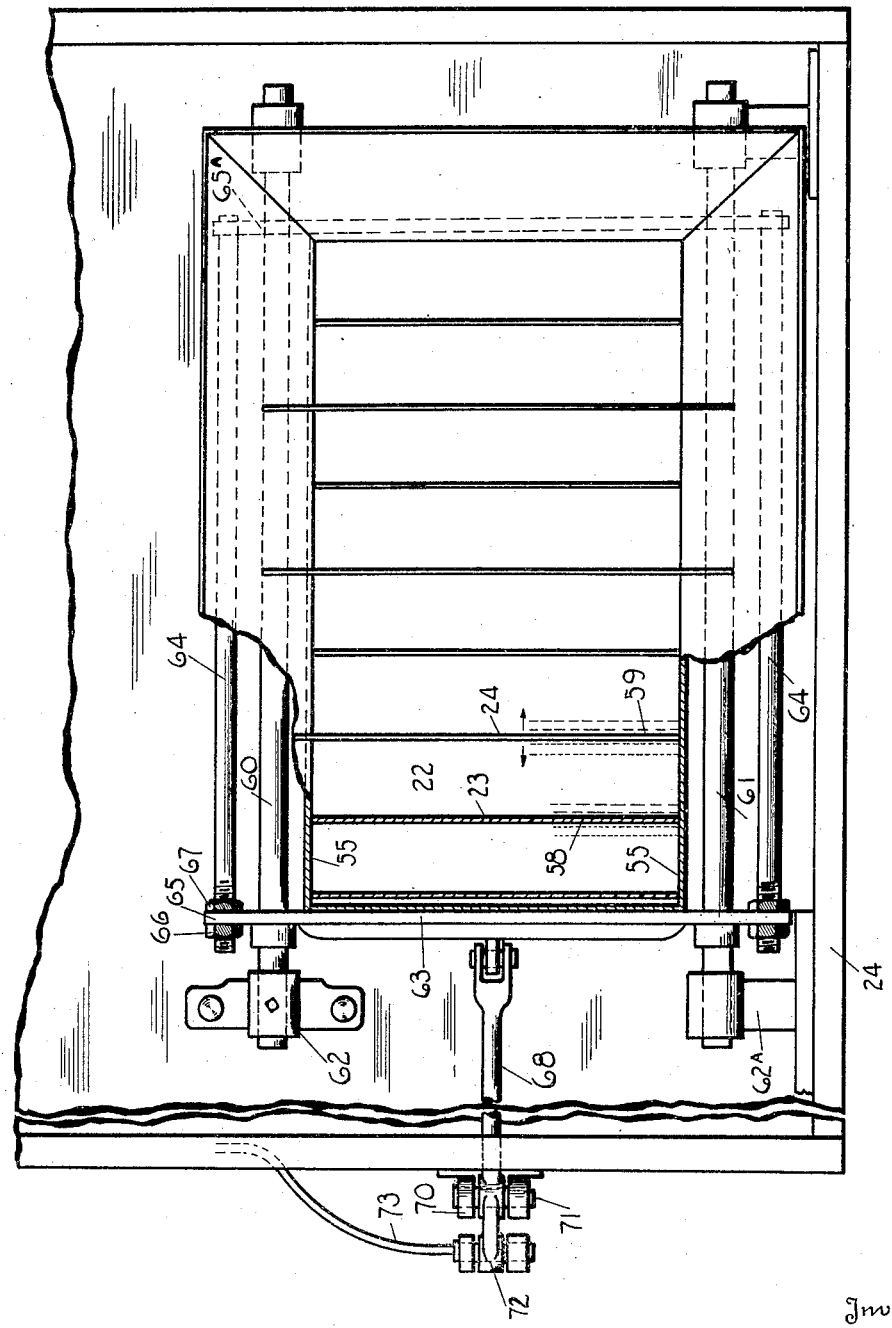

1,915,121

UNITED STATES PATENT OFFICE

LEO R. H. BURTON AND VERNON E. COOK, OF ROME, NEW YORK

MACHINE FOR ARRANGING ELONGATED ARTICLES LENGTHWISE IN ROWS AND CONVEYING THE ARTICLES LENGTHWISE OF THE ROWS

Original application filed March 17, 1931, Serial No. 523,314. Divided and this application filed March 17, 1932. Serial No. 599,564.

This invention relates to an apparatus or machine for arranging elongated articles lengthwise in rows and in the full embodiment of the invention for conveying the articles lengthwise of the rows. The apparatus or machine is particularly useful with a machine for cutting string beans or similar elongated vegetables into short pieces and the invention is illustrated and described in connection with such a string bean cutter. It will be understood, however, that the sorting and feeding apparatus or machine of this invention may be used with a machine cutting other things than string beans such as celery, okra, rhubarb, asparagus and the like or may be used in sorting and feeding elongated articles preliminarily to their being conveyed to or operated upon by other mechanism than a cutting machine, such other operations including not only the actual operating upon or changing of the articles but the arranging or packaging of them into bundles or containers. It will be understood as appears from the claims that the invention is not limited to that use, but may be employed in other situations.

The subject-matter of this application was formerly a part of our application filed March 17, 1931, Serial Number 523,314.

The purpose of our present invention is to provide a new and improved apparatus or machine for arranging elongated articles into rows and in some embodiments of our invention in conveying the said articles so arranged lengthwise of the rows; to provide an apparatus or machine of the character named which is so constructed and has its parts so combined as to be adapted to work with greater efficiency and regularity; to provide a machine of the character described that is well adapted to receive elongated articles such as string beans in an indiscriminate mass and sort the same into parallel rows in which the beans are arranged lengthwise and to convey them thus arranged lengthwise of the rows towards another machine or device such as a bean cutter; to have the arranging and feeding apparatus of such construction and arrangement of its parts that the string beans or other articles being operated upon will be arranged and progressed automatically by the machine without the personal attention of a workman; to provide in such a feeding and conveying device a vibrating feeding chute so constructed and operated as to move in co-operation with another machine and particularly to have the discharge end of said chute while still vibrating move in the direction of a part of a circle so as to follow closely the circle of a feed roll of the adjacent mechanism such as the feed roll of a bean cutter thus enabling the feeding chute to move in a short curved path substantially concentric with the adjacent face of the feed roller of the bean cutting machine so that at no time can considerable portions of beans evade the cutting mechanism nor be cut or bruised by being caught between the delivery end of the chute and the adjacent surface of the feed roller of the bean-cutting machine or other machine with which the feeding mechanism is used.

A further purpose in such a machine is to provide means including a movable hopper and partitions fixed in said hopper leading to a vibrating chute for aiding and arranging the elongated articles into such parallel rows with said articles lengthwise thereof and to have such means consist of such a movable hopper with fixed upright partitions parallel with the said passageways and with said hopper and partitions given a horizontal movement back and forth but transversely of or at right angles to the length of said partitions.

Another purpose is to provide means and combinations of parts and co-operation between the parts of such a machine that will result in greater production or capacity of the machine.

Further purposes and advantages of our machine will appear from the specification and claims herein.

Fig. 1 is a side elevation of a machine embodying one form of our invention, parts of the machine being broken away to more clearly show the construction.

Fig. 2 is a vertical sectional view from front to rear of the machine mostly on line 2—2 of Fig. 3.

Fig. 3 is a vertical cross sectional view of the machine on line 3—3 of Fig. 2.

Fig. 4 is a top or plan view of the rear part of the machine, the left hand end of the hopper and parts of its partitions being broken away to more clearly show the construction.

Referring to the drawings in a more particular description it will be seen that the string bean cutting machine with which our present invention is herein illustrated, includes a suitable platform 10 having several uprights 11 extending thereabove and supporting a table 12. Spaced apart upon the platform 10 are the side frame members 13 between which are mounted the knife roller 14 and the feeding and anvil roller 15 upon shafts 16 and 17 respectively. The knife roller 14 comprises a roller proper 18 in which are set parallel radially projecting knives 19 the outer edges of which just meet the periphery of the roller 15 placed below the knife roller with said roller 15 operating as an anvil roller and also as the feeding roller to feed the beans forward beneath the knife roller from the lower end of the vibrating chute 20. The vibrating chute has side frame members 21 at its opposite sides, a bottom 22 and a plurality of spaced parallel upwardly extending walls 23 forming the desired number of spaced parallel guideways or passageways 24 slanting downwardly to the meeting line of said rollers from the opening 25 in the table 12. The bottom of these passageways it will be seen slope sharply downwardly so as to let the beans arranged endwise therein slide down towards the cutting mechanism. In order to expedite this sliding action, however, the said chute is given a rapid vibrating motion of the particular character to be hereinafter described. The walls 23 extend upward so that their upper ends reach nearly to the level of the upper surface of the table 12 but in all positions of the chute the said upper ends of the walls will be not above the said upper surface of the table. About the outer edges of this table is an upstanding flange 26 to retain the articles upon the table if such articles are to be hand-fed to said chute. Preferably, however, with this machine there will be used the automatic or power-feeding device consisting of the bodily movable hopper 55, partitions 58 and 59 fixed therein and described in detail hereinafter.

Preferably the shaft 17 carrying the feeding and anvil roller 15 will be driven through a train of gears 28 on shaft 17, 47 an intermediate gear and 46 a gear on the main shaft 39 driven by power transmitted to a pulley 27 on the right hand end of the machine as seen in Fig. 3. The said gear 28 on shaft 17 also meshes with an aligned gear 29 secured to the shaft 16 carrying the knife-equipped roller 14.

At the opposite sides of the chute 20 near the upper rear end, that is right hand end of the chute as the parts are seen in Fig. 1, there are provided two spaced hangers 30 secured to the under side of the table 12 and providing bearings for the opposite ends of a shaft 31. This shaft is a little ways below the adjacent bottom side frame members 21 of the chute 20. From each frame member 21 there projects downwardly a bracket 32. In the lower end of each one of these is the upper half 33 of a collar, the lower half 34 of which is detachably secured thereto, with said two half collars adapted to encircle an eccentric wheel 35 fixed upon the said shaft 31. The hangers 30 and the eccentric wheels 35 and collar members 33 and 34 secured to the bracket 32 thus form the means for supporting the upper end of the chute 20, but of course this end of the chute being supported through said eccentric wheels will receive the combined up and down motion and motion from right to left as the parts are seen in Fig. 1 incident to said support being through an eccentric wheel.

Below the lower or left hand end of the chute as the parts are seen in Fig. 1 there is suitably mounted in the spaced frame members 13 the main shaft 39 to which are secured two similarly positioned eccentric wheels 40 each one of which are about below the opposite sides of said chute 20. Each of these eccentric wheels has its periphery enclosed by a collar formed of a half collar 41 detachably secured to the upper half collar 42 formed integral with or fixedly secured to the lower end of an arm 43. The upper end of each arm has a pivot joint 44 upon the ear 45 downwardly projecting from each side member 21 at the bottom edge of the chute 20. The shaft 39 carrying the eccentric wheels to operate the lower end of the chute 20 has fixed thereon the gear 46 which engages the intermediate gear 47 which in turn engages a gear 29 secured to the knife shaft 17. The two pairs of eccentric wheels are driven at the same speed by the respective shafts being connected by a sprocket chain 36 engaging at one end a sprocket wheel 37 fixed upon the lower or main power-driven shaft 39 and engaging at its upper end a similar sized sprocket wheel 38 fixed upon the shaft 31 carrying the upper pair of eccentric wheels 35.

The lower end of chute 20 is thus supported from the fixed frame members 13, but being supported through intervening eccentric wheels 40 and arm 43 and ear 45 the lower end of said chute is given the peculiar combined motion incident to being operated by an eccentric wheel.

It is to be noted, however, that the two sets of eccentric wheels 35 and 40 at the upper and lower ends of said chute are not mounted with the large diameters of the eccentrics extending in the same direction at the same time, but are on the contrary mounted with the two sets of eccentric wheels at decidedly different positions. In fact in practice in the machine as here shown one set of the eccentrics are mounted practically at right angles to each other. This is done in order to obtain the desired motion of the lower horizontal edge 49 of the chute adjacent the feed roller 15. The motion obtained is that this lower edge 49 travels very close to the adjacent portion of the periphery of the feed and anvil roller 15 and practically concentric therewith for an appreciable distance so that said lower edge travels practically in a curved direction back and forth following the curve of the periphery of wheel 15. In this way the beans are at all times fed directly to the upper feeding surface of said feed roller 15 relatively close to the meeting line of said feed roller and the knife roller and there is at no time any appreciable space between the said lower edge 49 of the chute and the feed roller through which, portions of beans may drop and so evade being properly cut by the cutting mechanism. It will be seen that this different location or different relative setting of the two pairs of eccentric wheels avoids a locking of the eccentrics through the pivot joint 44 provided between the arms 43 leading from the lower eccentrics to the adjacent lower end of the chute by means of the ears 45.

There will now be described that part of the machine relating more particularly to the apparatus for automatically feeding the indiscriminate mass of beans more regularly into the guideways 24 of the chute 20. The means we provide for so automatically feeding the string beans into said guideways comprises a hopper 55 mounted to move back and forth bodily upon the table 12 immediately over the opening 25 therein leading to the guideways and the chute. This hopper preferably consists of a lower portion 56 having vertically arranged walls in the form of a rectangle and an upper portion 57 also rectangular but having walls which slant outwardly as they extend upwardly. In this hopper are provided vertically arranged parallel partitions preferably of unequal height and preferably forming two series as low partitions 58 and high partitions 59 alternately spaced apart as appears in Figs. 3 and 4. These partitions are arranged parallel to the walls 23 forming the sides of the guideways 24 of the chute therebelow and are preferably spaced apart the same distance as said walls of the chute. This entire hopper with its partitions 58 and 59 is bodily moved in a horizontal direction back and forth for a short distance on the table 12 with such motion being at right angles to the partitions 58 and 59 and accordingly at right angles to the upper edges of the walls 23 forming the boundaries of the guideways 24 of the chute 20. The means for so supporting and moving said hopper comprise two spaced rods 60 and 61 located to the front and back respectively of the smaller lower portion of the hopper 55 and supported a short distance above the table 12 by upstanding brackets 62 towards the front and similar brackets 62' extending forward from the back flange 26 of the box. Slidingly mounted upon these spaced rods 60 and 61 are the opposite ends of two clamping bars 63 engaging the right and left hand ends of the lower portion of said hopper as seen in Figs. 3 and 4. These clamping bars 63 are drawn against the adjacent ends of the hopper by means of rods 64 screw-threaded at their ends with one end screw-threaded into the boss 65ᵃ on the right hand bar 63 and with the other end projecting through outwardly extending bosses 65 on the left hand clamping bar 63 as seen in Figs. 3 and 4. The opposite clamping bars are drawn tightly against the hopper by means of outer nuts 66 engaging the said projecting screw-threaded ends of the rods 64. The joint thus made is locked by inner lock nuts 67 brought up against the inner end of said clamping bars on said rods 64.

It will be understood that the hopper is thus supported just above the table but with its bottom close enough to the top of the table and to the top edge of the walls 23 so as to guide the beans from between the partitions 58 and 59 into the guideways 24. The extent of travel of the hopper is small relative to the width of the spaces between the partitions 58 and 59 and the width of the guideways 24 so that the partitions 58 and 59 only slightly pass to the right or left of the walls 23 therebelow as indicated respectively by the dash line and dotted line position of 58 and 59 in Fig. 4 and so give no opportunity for the beans to be cut or damaged or become clogged between the said moving parts. The last-mentioned result is further aided by having the lower edges of the partitions spaced up a little farther from the table.

The means for imparting the reciprocating motion to the hopper consists of a connecting rod 68 having its inner end attached to one of the clamping bars 63. The other end of this rod is connected at 69 to the upstanding arm 70 of a bell crank the fulcrum of which is the short shaft 71 and the other arm 72 of which is pivoted to the upper end of a link 73 passing downwardly to a collar 74 engaging and encircling an eccentric wheel 75 mounted upon the projecting end of the main shaft 39.

It will now be seen that we have produced a machine of the character described which is especially well adapted to accomplish the purposes and attain the objects mentioned at the beginning of the specification.

Particularly, it will be seen that we have provided safe and effective means for causing the lower edge of the chute being the edge that is close to the combined feeding and anvil roller to be at all times practically the same distance from the feeding roller, notwithstanding that the whole chute and this lower edge is being rapidly reciprocated in order to shake down the beans in said chute. The reciprocating movement of this lower end of the chute is so controlled that the said lower edge of the chute travels back and forth a short distance circumferentially of the periphery of the combined feeding and anvil roller and so back and forth in a curved path which is at all positions a substantially equal distance from the surface of the said roller. This arrangement allows the lower edge of the chute to travel closer to the feeding and anvil roller than was safe when the chute traveled towards and away from the roller. Our machine prevents portions of beans slipping between the said roller and the lower end of the chute where they would avoid being cut and would tend to clog the machine. The previously used motion of having the lower edge of the chute successively approach towards and receed from the roller allowed parts of beans to be crushed or bruised by being caught between the advancing chute and the relatively fixed roller, causing injury to the quality and appearance of the product. Our form of machine avoids such damage to the vegetables being handled and so increases the quantity and quality of the product, by reason of our chute avoiding the advancing or punching movement heretofore commonly used.

It will be seen also that the upper end of our chute is given a decided and extended movement instead of the almost negligible movement of the original Townsend string bean cutter and in this way our machine effects a great speeding up of the feeding of the beans down the chute towards the cutter. In the former machine the feeding action at the upper end of the chute was sluggish and far below the capacity of the cutter or knife roller.

This great speeding up by our new machine of the feeding of beans through the chute, however, only emphasizes the slow feeding of the beans from the table above the chute down into the chute by hand operation of a man or woman moving the beans about. By providing the mechanical feeding device described herein for use on the table or in the bin above the chute, we not only save altogether the services of an operator to keep feeding the beans from the table but by proper arrangement of the mechanical or automatic feeding device we get a feeding above the chute that is always working and moreover working faster than would be possible for one operator. By combining these features to co-operate in one machine, we have produced a machine that very greatly increases the output of the machine and yet saves the services of an attendant.

It will now be apparent that as suggested earlier in the specification the machine herein described is not limited to use simply as a string bean cutter, but may be used to operate upon other elongated vegetable produce such as celery, okra, rhubarb and asparagus. Furthermore, it will be obvious that the sorting and conveying mechanism herein described may be used without change or with obvious mechanical changes to sort and convey vegetable produce to a machine other than a continuously operating rotating cutter. For instance, the sorting and conveying apparatus here shown may be readily used in connection with a proper cutting device to sort and convey string beans to a snipping mechanism to cut the two ends from the beans or to cut the two ends from cucumber pickles or to cut one or both ends from other elongated vegetable produce.

It is obvious also that the sorting and conveying mechanism herein described and illustrated may be used with machines other than those to cut or trim vegetable produce or may be used where no operation is to be performed upon the produce other than arranging them temporarily into bundles or groups for further subsequent operations or where the articles are arranged permanently into groups and at once placed into the bottles, cans or other permanent containers therefor.

It will also be noted that the sorting and conveying mechanism herein described and illustrated may be used either exactly as shown or with obvious mechanical changes not involving invention to sort and convey elongated articles of various sorts other than vegetable produce.

What we claim as new and desire to secure by Letters Patent is:

1. In a machine for arranging and conveying elongated articles, the combination of a chute having a slanting bottom and upstanding division walls forming a plurality of parallel passageways slanting downwardly towards the delivery end of the chute and adapted to feed the said articles endwise towards said delivery end and means including eccentric wheels adjacent the opposite ends of said chute, said eccentric wheels being set at different points for movably mounting said chute so that its delivery end will have a movement back and forth following the curve of part of a circle, a hopper arranged closely over the upper end of said chute and having fixed in its lower part, upright partitions extending in the same direction as, and spaced corresponding to, the division walls of said chute, said hopper being mounted to be reciprocated horizontally a short distance transversely of the length of its partitions and of the length of said passageways of the chute and means to so move said hopper.

2. In a machine for arranging and conveying elongated articles, the combination of a chute having a slanting bottom and upstanding division walls forming a plurality of parallel passageways slanting downwardly towards the delivery end of the chute and adapted to feed the said articles endwise towards the said delivery end and means including eccentric wheels adjacent the opposite ends of said chute, said eccentric wheels being set at different points for movably mounting said chute so that its delivery end will have a movement back and forth following the curve of part of a circle, a hopper arranged closely over the upper end of said chute and having fixed in its lower part upright partitions alternately of different heights and extending in the same direction as, and spaced corresponding to, the division walls of said chute, said hopper being mounted to be reciprocated horizontally a short distance transversely of the length of its partitions and of the length of said passageways of the chute and means to so move said hopper.

3. In a machine for arranging elongated articles lengthwise in rows and conveying the same so arranged lengthwise of the rows, the combination of a hopper to receive the articles indiscriminately and having spaced parallel upstanding partitions fixed in the lower part of the hopper, said hopper being movably mounted to move back and forth horizontally transversely of the length of said partitions, a chute located beneath said hopper and having upstanding walls spaced apart substantially the same distance as the partitions in the said hopper and parallel therewith and in alignment with the average position of said hopper partitions, whereby the articles sorted into a row between adjacent partitions of the hopper fall into the space between adjacent walls therebelow, the said chute having a bottom slanting downwardly as it extends in the line of said partitions away from the end of the chute immediately beneath said hopper, and means for reciprocating said chute in the direction of its walls.

4. In a machine for arranging elongated articles lengthwise in rows and conveying the same so arranged lengthwise of the rows, the combination of a hopper to receive the articles indiscriminately and having spaced parallel upstanding partitions fixed in the lower part of the hopper, said hopper being movably mounted to move back and forth horizontally transversely of the length of said partitions, a chute located beneath said hopper and having upstanding walls spaced apart substantially the same distance as the partitions in the said hopper and parallel therewith and in alignment with the average position of said hopper partitions whereby the articles sorted into a row between adjacent partitions of the hopper fall into the space between adjacent walls therebelow the said chute having a bottom slanting downwardly as it extends in the line of said partitions away from the end of the chute immediately beneath said hopper, and means for reciprocating said chute lengthwise thereof and up and down in the direction of its walls.

In witness whereof we have affixed our signatures, this fourth day of March 1932.

LEO R. H. BURTON.
VERNON E. COOK.